Jan. 14, 1947.  C. W. BRISTOL  2,414,221
MULTIPLE RECORD APPARATUS
Filed Aug. 5, 1942

INVENTOR.
Carlton W. Bristol
BY
E. C. Sanborn
Attorney

Patented Jan. 14, 1947

2,414,221

UNITED STATES PATENT OFFICE 2,414,221

MULTIPLE RECORD APPARATUS

Carlton W. Bristol, Naugatuck, Conn., assignor to The Bristol Company, Waterbury, Conn., a corporation of Connecticut Application August 5, 1942, Serial No. 453,623

5 Claims. (Cl. 234—67)

This invention relates to the art of recording, and more especially to the provision on a common chart of concurrent records of the values of a plurality of variable magnitudes. In many industrial practices and in engineering tests it is desirable to obtain, juxtaposed for ready reference, records of the values attained by a number of similar magnitudes, such as fluid pressures; and in some instances it has been a practice to provide a recording instrument in which either a plurality of pens or other marking devices responding to variations in the several magnitudes, or one pen successively associated with said magnitudes, would inscribe a corresponding number of records on the same time graduations on a common chart. While records obtained in this manner have many uses, and in some instances are indispensable, the recording apparatus is necessarily intricate, and in many cases there arises an objectionable feature of crossing of the graphs, or of the recorded magnitudes following almost identical values for periods of time sufficient to render identification of individual records extremely difficult.

It is an object of the present invention to provide a recording instrument of the continuous chart class especially adapted for recording a plurality of magnitudes, and in which the scale available for the representation of each recorded magnitude shall be the full width of the graduated portion of the chart.

It is a further object to provide an instrument of the above class in which there shall be no interference between the respective graphs.

It is proposed to provide a recording instrument of the circular chart type, in which the recording surface shall be divided into a number of sectors, each corresponding to one of the several magnitudes under measurement, and to cause the pen or marking member to record for short intervals successively in the respective sectors, the chart being periodically advanced from one recording area to another, the measuring element being temporarily associated with respective corresponding magnitudes, and the chart being subjected to a further motion, whereby with the progress of time the successive recordings of the pen in each sector are caused to progress from one limit to the other of the sector.

Other features and advantages of the invention will be hereinafter described and claimed.

Figure 1:
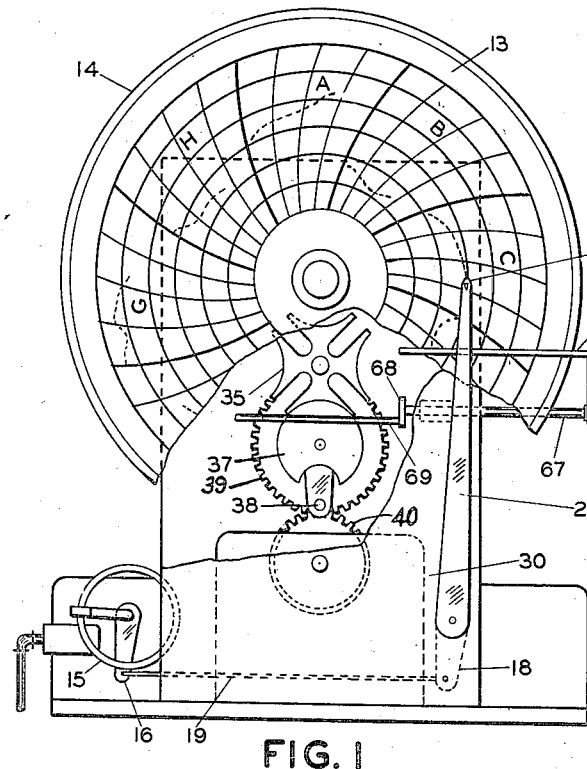
Figure 2:
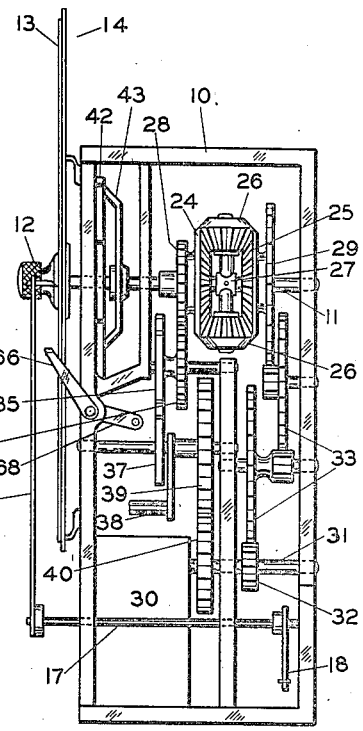
Figure 3:
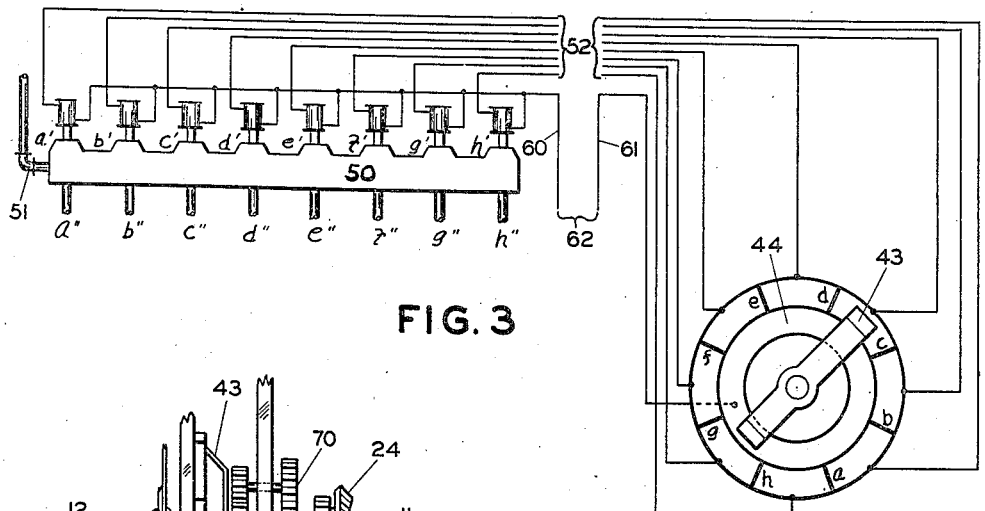
Figure 4:
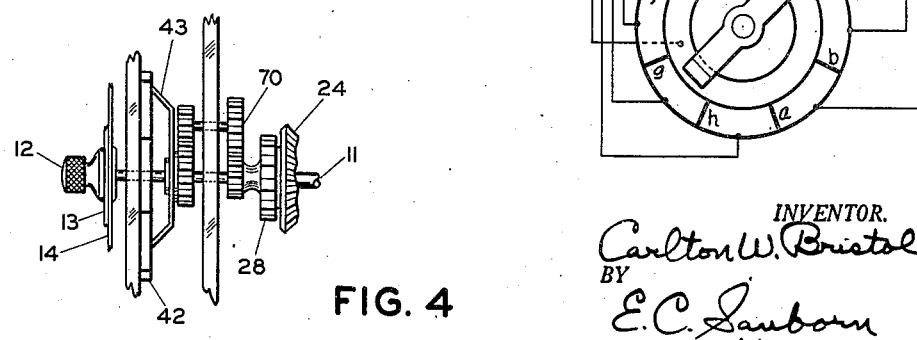

In the accompanying drawing:

Figs. 1 and 2 are respectively a front and side elevation of an instrument embodying the principles of the of the invention. Fig. 3 is a diagram showing certain connections which may be employed. Fig. 4 is a side elevation of an alternative form of an element of the mechanism.

Referring now to the drawing, the numeral 10 represents a frame having suitable mountings and journals for the various elements of the mechanism. Rotatably mounted on the frame 10 is a shaft or spindle 11 projecting through the front portion of said frame and carrying a conventional chart clamping device 12 whereby a circular record chart 13 may be attached to said spindle and caused to rotate therewith. A flat platen 14 fixed to the frame 10 provides a backing for the chart 13 so that a record may be inscribed upon the front face thereof.

A measuring element 15, which in this instance is shown as taking the form of a fluid pressure-sensitive member such as a Bourdon spring, is mounted upon the frame 10 and carries an arm 16 adapted to be deflected by changes in the dimension of the spring with variations in internal fluid pressure. A spindle 17 rotatively mounted on the frame 10 parallel to the spindle 11 has fixed to it an arm 18 operatively connected to the arm 16 by a link 19, whereby motion of the arm 16 is transmitted to the arm 18, causing the spindle 17 to be angularly deflected with variations in fluid pressure applied to the element 15. Attached to the spindle 17 is an upwardly-extending pen arm 20 carrying at its upward extremity a pen or stylus 21 adapted to be moved substantially radially to chart 13 and to inscribe thereon a record of all positions which it may attain.

Mounted upon the spindle 11 is a differential gearing embodying two sun wheels 24 and 25 both free for rotation upon the spindle 11, and a planetary member having planet wheels 26 meshing with said sun wheels and rotatably mounted upon perpendicularly disposed bearing members carried by a hub element 27 which is fixed to the spindle 11. Attached to the sun wheel 24 is a spur gear 28, and attached to the sun wheel 25 is a spur gear 29.

Mounted upon the frame 10 is a constant speed clock or motor timing element 30 having a shaft or spindle 31 adapted to be rotated at a constant angular velocity. Carried by the shaft 31 is a pinion 32 meshing with an element of a gear train 33 whereby said pinion is caused to drive the gear 29 and the sun wheel 25 attached thereto at a slow speed suitable for imparting a desired normal timing velocity to the circular chart. For purposes of explanation, the speed of rotation of said sun wheel 25 may be taken as being one revolution in 16 hours.

Rotatably mounted upon the frame 10 is an idler comprising the driven member 35 of a Geneva gearing, and a spur gear 36 meshing with the gear 28. The driving member of said Geneva gearing includes a locking element 37 and a driving pin 38, both forming integral parts of an idler rotatably mounted on the frame 10 and including a gear member 39 meshing in turn with a gear 40 carried by the spindle 31 of the motor element 30, whereby the sun wheel 24 will be intermittently driven from the element 30 through said Geneva gear. The gear train between the motor element 30 and the gear 26, including the Geneva gear, is so proportioned that the equivalent angular velocity of the gear 28 and the sun wheel 24 will be relatively high with respect to that of the sun wheel 25. For purposes of explanation this relationship may be taken as such that the sun wheel 24 will advance ¼ of a revolution with each impulse, and will receive an impulse each 15 seconds. Thus, the angular displacement of the sun wheel 24 will amount to 1 revolution per minute.

While the mechanism as thus far set forth has been shown of a form in which both sun wheels of the differential gearing receive their motion from a common source (the motor 30), yet it will not in any way constitute a departure from the spirit of the invention to have the two elements of the differential train driven from independent constant speed sources.

Mounted upon a suitable insulating base attached to the frame 10 is a multiple point electric switch 42 having eight segments, $a, b, c, d, e, f, g, h$, (See Fig. 3) which by means of a rotatable contact arm 43 fixed to the shaft 11 may be individually and selectively placed in electrical connection with a common contact 44 according to the angular position of the shaft 11. As shown in the drawings, the switch arm 43 is in contact with the segment $c$.

The circular chart 13 has its record surface divided into eight equal sectors, these being separated by relatively heavy radial lines printed on the chart. The instrument being considered for purposes of explanation as designed for a four-hour run, each of the sectors is divided into four spaces representing the hours, by relatively light lines printed on the recording surface. The sectors are designated A, B, C . . . G, H, to correspond to the several segments of the switch 42. In correspondence with the position of the arm 43, the pen 21 is shown as resting in the sector C of the chart.

In Fig. 3 is shown means by which the instrument is selectively associated with a variety of similar magnitudes to be measured, said magnitudes being in this instance fluid pressure. A manifold 50 serves as a common body member for a group of solenoid-operated valves having actuating coils $a', b'$, etc., corresponding to the segments of the switch 42. The valves actuated by the several solenoids are arranged to provide connections between a common conduit 51 and a selected one of a plurality of conduits $a'', b'', c''$, etc., corresponding to the respective solenoids. A group of electrical conductors 52, the wiring of which is clearly shown in Fig. 3, provides connection between one side of each of the solenoids and the corresponding one of the segments of the switch 42. The free terminals of the solenoids are connected to a common conductor 60, and the contact 44 to a conductor 61, and these last-named conductors to the two sides of an electrical supply source 62. Thus, with the arm 43 of the switch 42 resting upon the segment $c$, as shown, the solenoid $c'$ will be energized and the conduit $c''$ will be placed in communication with the conduit 51 whereby pressure in the conduit $c''$ will be applied to the element 15 and the measure of its pressure expressed by the position of the pen 21 with respect to the graduated surface of the chart 13.

For the purpose of lifting the recording pen from the surface of the chart during rapid advancement of the latter when changing from one recording sector to another, there is provided an arm 65 extended parallel to the surface of the chart between the pen arm 20 and the chart. The arm 65 is carried by a lever 66 mounted upon a spindle 67 extended parallel to the surface of the chart to the rear of the platen 14 and journaled to the frame 10. Attached to the spindle 67 is a lever arm 68 projecting rearwardly and carrying a transversely-extending pin 69 adapted to be engaged by the pin 38 of the Geneva gear in such a manner that, during the interval that the pin 38 is in engagement with the driven member 35 to advance the same, said pin 38 will also engage the pin 69 carried by the lever arm 68 and will thereby rotate the spindle 67 through a small angle, moving the arm 65 away from the surface of the chart 13 and into engagement with the pen arm 20, whereby the pen 21 will be lifted from the surface of the chart and will remain so lifted until the chart has been advanced through the width of one of the record sectors by action of the Geneva gear. As the pin 38 becomes disengaged from the member 35 it also releases the pin 69 and the mechanism actuated thereby, allowing the pen 21 to come into engagement with the surface of the chart and to inscribe thereon a record until the pin 38 is again brought into engagement with the pin 69.

The operation of the device as thus far set forth may be described as follows: Assuming first, that the sun wheel 24 of the planetary gearing is at rest, the sun wheel 25, being driven at a continuous low velocity by the timing element 30 through the gear train 33, will cause the planetary member of the differential gearing to rotate the spindle 11 and the chart 13 attached thereto at an angular velocity half that of the sun wheel 25. The gearing having been selected, as hereinbefore pointed out, to rotate the sun wheel 25 at a speed of one revolution in sixteen hours, the spindle 11 carrying the chart 13 will cause the same to rotate at a rate representing one complete revolution in thirty-two hours, or to traverse one of the eight sectors A, B, C, etc. in an interval of four hours.

Assuming now for purposes of explanation that the sun wheel 25 is held stationary, the sun wheel 24, being periodically advanced through the action of the Geneva gear at a rate corresponding to one revolution per minute, will tend to rotate the spindle 11 and the chart 13 intermittently at such a rate that the chart will make one complete revolution, representing eight fifteen-second increments, in two minutes.

Under actual operation conditions, both trains of gearing through which motion is transmitted from the timing motor 30 to the spindle 11 are in operation simultaneously, so that the chart partakes of a motion which is the resultant of the two. Assuming that the pen is resting upon the sector A, during such time as the Geneva gearing is locked, the chart will be advanced at a steady slow rate through the action of the sun wheel 25 and associated gearing, so that the pen will act in a normal manner to inscribe within sector A, a record of the variable with whose measurement the pen is operatively associated. As the Geneva gear comes into action, the pen will be lifted from the chart through the action of the arm 65, and the chart will be rapidly advanced through an angle represented by one of the recording sectors, and the pen will then be lowered upon the chart in a time position in the sector B closely corresponding to that which it occupied in the sector A at the moment the Geneva gear went into action. Because of the fact that the sun wheel 25 will not have been at rest during the time the Geneva gear was in action, this relationship will not be exact, but the position of the pen with respect to the time graduations of the sector B will be slightly advanced as compared with the position it occupied in the sector A.

The pen will then proceed to inscribe within the sector B a record of its movements, which record will be continuous until the Geneva gear again comes into action advancing the chart and bringing the pen into recording position in the sector C as shown in Fig. 1. This intermittent shifting of the chart will continue, so that the pen is progressively brought into engagement with the successive sectors of the chart until the Geneva gear has imparted eight impulses to the chart spindle and caused the pen again to be brought into engagement with the recording surface in the sector A. The position occupied by the pen with respect to the time graduations in sector A will be advanced with respect to its former position by an amount representing the advance of the spindle 11 due to the influence of the sun wheel 25 during the two minutes required by the Geneva gear to carry the chart through a complete cycle. Thus the pen will inscribe upon the chart an intermittent record, comprising portions successively marked in the recording sectors A, B, C, etc.

Operative association between the pen and the magnitude to be recorded is carried out by means of the solenoid valves $a'$, $b'$, $c'$, successively associating the Bourdon spring 15 with pressures existing in the conduits $a''$, $b''$, $c''$, etc. through the movement of the contact arm 43 in relation to the switch segments $a$, $b$, $c$, etc. Thus, with each increment of advance of the chart the arm 43 is advanced into engagement with the corresponding segment of the multi-point switch, causing the corresponding solenoid valve to be energized and the pen 21 to provide a record of the magnitude which has been selected to correspond with the particular sector in which it is recording.

If the arm 43 is attached to the spindle 11, as shown in Fig. 2, it will rotate in exact synchronism with the chart 13, and will, therefore, partake of its gradual progressive motion. Thus, it will be necessary that upon a record being started, the arm 43 will require to be positioned close to one end of the particular sector upon which it may happen to rest. As the record approaches completion, the arm 43 will have progressed until it comes to rest in positions closely approaching the other end of whichever sector it happens to rest upon. This characteristic will require that, in addition to the need for setting the contact arm 43 at the start of a record, there will be a certain "dead" zone which would be represented by a relatively broad space between each pair of adjacent sectors. This may be avoided by eliminating the progressive advance component from the rotation of the contact arm 43, while retaining said component in the rotation of the chart. Mechanical means whereby such results may be attained are shown in Fig. 4 of the drawings. In this embodiment of the invention the contact arm 43 is not attached to the spindle 11 but rotates freely thereon. The angular motion of the contact arm 43 is derived from the gear 23, which rotates at the same speed as the sun wheel 24, by means of an idler 70 whereby the contact arm 43 is caused to rotate with respect to the multiple-point switch at an angular velocity exactly half that of the sun wheel 24, and to maintain a definite angular relationship to the Geneva gear, so that, for each impulse received by the mechanism through said Geneva gear, the contact arm will always come to rest on the same portion of the segment of the switch. Thus, if the contact arm be initially set at the middle point of a sector, it will always come to rest at a middle point and will require no further setting as successive records are made.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

Having described my invention, what I claim is:

1. In an instrument for selectively recording a plurality of measured magnitudes, the combination of a movable chart having thereon a plurality of recording areas corresponding to said magnitudes and having predetermined locations displaced in the sense of advance of said chart, an element adapted for measuring any one of said magnitudes and having a pen to inscribe in said areas records of measurements determined by said element, timing means for advancing said chart and including a differential gearing having two sun wheels and a planetary member, said chart being driven from said planetary member, means for driving one of said sun wheels at a constant low speed, and means for driving the other of said sun wheels periodically at a relatively high speed, together with means for selectively associating said element with said magnitudes to measure the same.

2. In an instrument for selectively recording a plurality of measured magnitudes, the combination of a movable chart having thereon a plurality of recording areas corresponding to said magnitudes and having predetermined locations displaced in the sense of advance of said chart, an element adapted for measuring any one of said magnitudes and having a pen to inscribe in said areas records of measurements determined by said element, timing means for advancing said chart and including a differential gearing having two sun wheels and a planetary member, said chart being driven from said planetary member, means for driving one of said sun wheels at a constant low speed, and means for driving the other of said sun wheels periodically at a relatively high speed, together with means driven concurrently with said last-named sun wheel for selectively associating said element with said magnitudes to measure the same, as said chart is advanced.

3. In a recording instrument, the combination of a movable chart, a pen to inscribe thereon a graphic record of a variable magnitude, differential means connected to said chart, means connected to a portion of said differential means for continuously driving said chart at a constant low speed, and means comprising Geneva gearing connected to another portion of said differential means for periodically advancing said chart at a relatively high speed.

4. Apparatus for recording the values of a plurality of variable magnitudes, comprising a rotatable chart, a pen to record said values thereon, continuously operating means for rotating said chart at a constant low speed, intermittently acting means for rotating said chart at relatively high speed at regular intervals to bring into recording position successive predetermined areas of said chart assigned to the respective magnitudes, and means coordinated with said intermittently acting means for associating said pen with said variables, said intermittently acting means comprising Geneva gearing, and means actuated by a portion of said Geneva gearing for removing said pen from contact with said chart during said high speed rotation of said chart.

5. In an instrument for selectively recording a plurality of measured magnitudes, the combination of a movable chart having thereon a plurality of recording areas corresponding to said magnitudes and having predetermined locations displaced in the sense of advance of said chart, an element adapted for measuring any one of said magnitudes and having a pen to inscribe in said areas records of measurements determined by said element, timing means for advancing said chart and including a differential gearing having two sun wheels and a planetary member, said chart being driven from said planetary member, means for driving one of said sun wheels at a constant low speed, and means comprising Geneva gearing connected to the other of said sun wheels for driving the latter periodically at a relatively high speed, together with means for selectively associating said element with said magnitudes to measure the same.

CARLTON W. BRISTOL.